(12) United States Patent
Kamei (10) Patent No.: US 9,256,812 B2
(45) Date of Patent: Feb. 9, 2016

(54) IMAGE FORMING APPARATUS AND METHOD FOR MANAGING JOB DATA

(71) Applicant: KONICA MINOLTA, INC., Chiyoda-ku, Tokyo (JP)

(72) Inventor: Tasuku Kamei, Hachioji (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/661,708

(22) Filed: Mar. 18, 2015

(65) Prior Publication Data
US 2015/0269458 A1 Sep. 24, 2015

(30) Foreign Application Priority Data

Mar. 18, 2014 (JP) ................. 2014-055482

(51) Int. Cl.
*H04N 1/60* (2006.01)
*G06K 15/02* (2006.01)
*G06K 15/12* (2006.01)
*G06K 1/00* (2006.01)

(52) U.S. Cl.
CPC ............. *G06K 15/027* (2013.01); *G06K 15/12* (2013.01); *G06K 15/1878* (2013.01)

(58) Field of Classification Search
None
See application file for complete search history.

(56) References Cited

U.S. PATENT DOCUMENTS

2006/0072135 A1* 4/2006 Umezawa ............ H04N 1/0044 358/1.9
2012/0050769 A1* 3/2012 Houjou ............... G06K 9/00221 358/1.9

FOREIGN PATENT DOCUMENTS

JP 2013-106126 A 5/2013

* cited by examiner

*Primary Examiner* — Quang N Vo
(74) *Attorney, Agent, or Firm* — Buchanan Ingersoll & Rooney PC (57) ABSTRACT

When, at a time of execution of processing of backup or restoration for job data, raster image data included in the job data is data generated using any state parameter other than a current state parameter, an image forming apparatus according to an embodiment of the present invention executes the processing of backup or restoration without including the raster image data as a target of the processing.

13 Claims, 10 Drawing Sheets

Table1: State parameter list

| key information | updated time | main body ID | status |
|---|---|---|---|
| ID101 | 201x/5/20 | apparatus 10a | previous version |
| ID102 | 201x/11/10 | apparatus 10a | current version(the latest) |

Table 2: List of saved jobs

| job ID | job ticket | key information | image data | raster image data | job execution time |
|---|---|---|---|---|---|
| job ID001 | T1 | ID101 | img1~img.3 | r1,r2,r3 | 201x/5/30 |
| job ID002 | T2 | ID101 | img1~img.4 | r1,r2,r3,r4 | 201x/5/30 |
| job ID003 | T3 | ID101 | img1~img.4 | r1,r2,r3,r4 | 201x/5/30 |
| job ID004 | T4 | ID101 | img1~img.4 | r1,r2,r3,r4 | 201x/11/8 |
| job ID005 | T5 | ID102 | img.1,img.2 | r1,r2 | 201x/11/11 |
| job ID006 | T6 | ID102 | img.1,img.2 | r1,r2 | 201x/11/11 |
| job ID007 | T7 | ID102 | img.1,img.2 | r1,r2 | 201x/11/11 |

Table 3: List of backed-up jobs

| main body ID | job ID | job ticket | key | image data | raster |
|---|---|---|---|---|---|
| apparatus 10a | job ID001 | T1 | - | img1~img.3 | - |
| apparatus 10a | job ID002 | T2 | - | img1~img.4 | - |
| apparatus 10a | job ID003 | T3 | - | img1~img.4 | - |
| apparatus 10a | job ID004 | T4 | - | img1~img.4 | - |
| apparatus 10a | job ID005 | T5 | ID102 | img.1,img.2 | r1,r2 |
| apparatus 10a | job ID006 | T6 | ID102 | img.1,img.2 | r1,r2 |
| apparatus 10a | job ID007 | T7 | ID102 | img.1,img.2 | r1,r2 |
| ... | ... | ... | ... | ... | ... |

| main body ID | key information | key classification information | status |
|---|---|---|---|
| aparatus 10a | ID102 | unique | the latest status parameter |
| aparatus 10b | ID201 | unique | the latest status parameter |
| aparatus 10x | ver1.1 | common | fixed state parameter A |
| aparatus 10y | ver1.1 | common | fixed state parameter A |
| aparatus 10z | ver1.2 | common | fixed state parameter B |

IMAGE FORMING APPARATUS AND METHOD FOR MANAGING JOB DATA

CROSS-REFERENCE TO RELATED APPLICATION

This application is based on Japanese Patent Application No. 2014-055482 filed on Mar. 18, 2014, the contents of which are incorporated herein by reference.

BACKGROUND

1. Technical Field

The present invention relates to an image forming apparatus that backs up and restores job data saved in an internal storage unit into another storage unit, and to a job data management method.

2. Description of Related Art

Image forming apparatuses using an electrophotographic system or the like for use in offices have been applied even to the print on demand (POD) market along with their higher-speed performance and higher functionality. Recent years have seen an expansion of uses of such image forming apparatuses.

In general, a printing-out process is as follows: a print job, which contains image data and a job ticket in which print settings are described therein, described in a printer language (PDL: page description language) is input to an image forming apparatus from a personal computer (PC). Then, the input image data is subjected to rasterization processing by a raster image processor (RIP) to generate raster image data, and based on the generated raster image data, an image forming unit forms an image on paper.

In image forming apparatuses applied to the POD market, print settings made by user are becoming more complicated in response to higher functionality and higher image quality. Then, in many cases, a work flow is employed in which tuning of print settings is done while confirming output results of a print job by test printing, and then final printing is performed.

Most image forming apparatuses for POD jobs are provided with a job saving and editing function for supporting such a work flow. The job saving and editing function saves, as a "saved job", a print job input to an image forming apparatus in a storage region inside the image forming apparatus to allow subsequent changes in print settings. Even when print settings are changed after input of a print job from a PC, the function allows the saved job to apply the changed print settings so that printing is performed using the post-change print settings. This makes it unnecessary to input the print job again from the PC.

In addition, Japanese Patent Application Laid-Open No. 2013-106126 (Patent Literature 1) discloses a technique in which a print job and a raster image obtained by rasterization of the print job are saved together and reused. The technique allows omission of rasterization in printing so that further productivity improvement can be achieved. Patent Literature 1 also discloses a technique for backing up a saved job, in which, when both image data and a raster image are saved, only the image data will be backed up, whereas when either one of the data is saved, the data will be backed up, together with a technique for restoring the backup data for reuse.

SUMMARY

However, in order to achieve even higher image quality, some image forming apparatuses are provided with a function for improving color reproducibility by updating, as appropriate, correction data of a lookup table (LUT) or the like for compensating changes in output characteristics caused by deterioration over time or the like to reflect the updated correction data on rasterization processing.

A concern about image forming apparatuses provided with such a function is that when a current image forming apparatus performs image formation by reusing a raster image resulting from rasterization processing performed by correction data before latest correction data, color reproducibility cannot be obtained appropriately. Accordingly, for improvement in color reproducibility, it is necessary to perform again rasterization processing using the latest correction data to create a raster image. Processing of backup or restoration of such a nonreusable raster image leads to wasteful consumption of a storage area and is therefore not preferable.

The present invention has been accomplished in view of the above circumstances. It is an object of the present invention to provide an image forming apparatus that prevents unnecessary processing of backup or restoration of a nonreusable raster image.

The above-mentioned object of the present invention is achieved by the following means.

To achieve the above-mentioned object, an image forming apparatus reflecting one aspect of the present invention includes: a rasterization processing unit that performs rasterization processing on image data using a state parameter to generate raster image data; an image forming unit that forms an image on a recording medium on the basis of the generated raster image data; a first storage unit that saves, as a set of job data, the image data and the raster image data generated from the image data; an update unit that updates the state parameter; and a job management unit that, in response to a received processing request targeting at least one set of job data, executes processing of backup from the first storage unit into a second storage unit or restoration from the second storage unit, in which (1) when determining that the raster image data included in the at least one set of job data as a target of the processing has been generated using any state parameter other than a current state parameter, the job management unit executes the processing for the at least one set of job data except for the raster image data, whereas (2) when determining that the raster image data included in the at least one set of job data as the target of the processing has been generated using the current state parameter, the job management unit executes the processing for the at least one set of job data including the raster image data.

DETAILED DESCRIPTION

Hereinbelow, embodiments of the present invention will be described with reference to the accompanying drawings. In the description of the drawings, the same elements are denoted by the same reference numerals, and redundant description is omitted. Additionally, in some cases, dimensional ratios in the drawings are exaggerated for descriptive convenience and different from actual ratios.

First Embodiment

Figure 1:
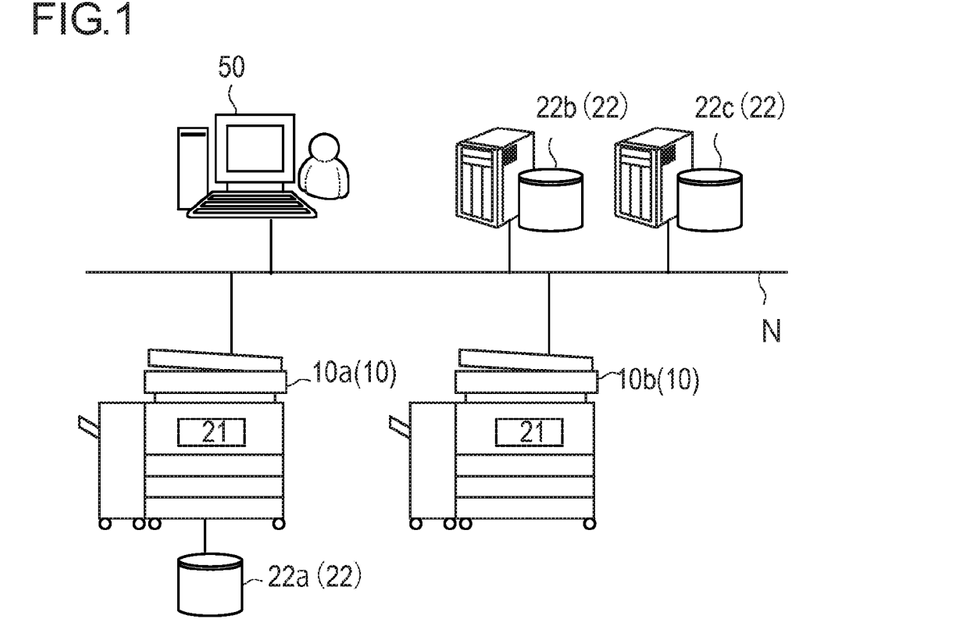
FIG. 1 is a schematic diagram mainly depicting a structure of an image forming apparatus 10.
Figure 2:
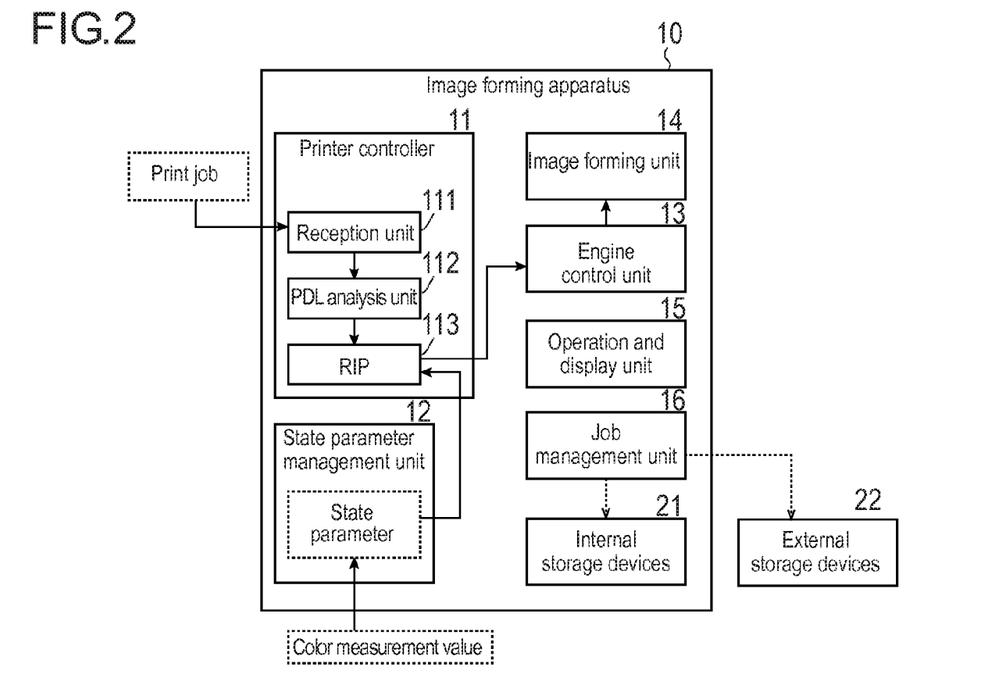
FIG. 2 is a block diagram of control of the image forming apparatus 10.
Figure 3A:
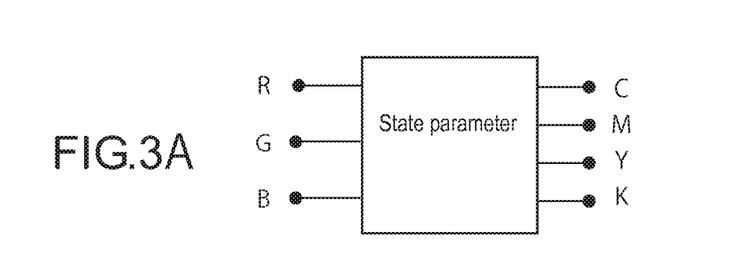
FIGS. 3A and 3B are schematic diagrams illustrating state parameters.
Figure 3B:
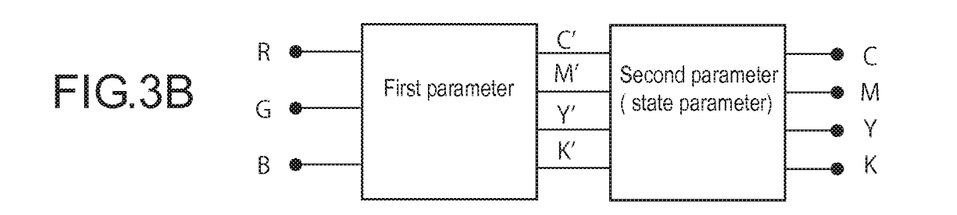
Figure 4:
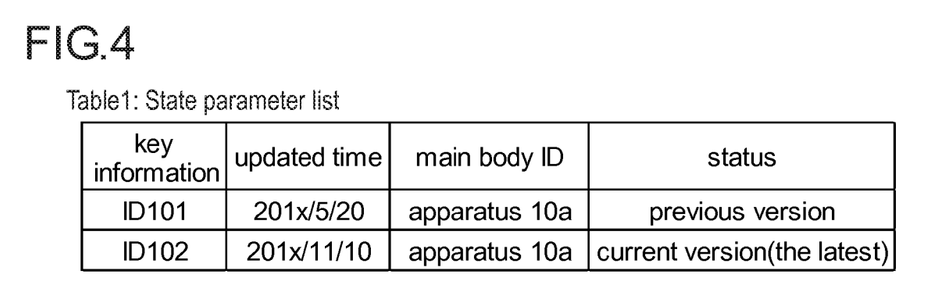
FIG. 4 is an example of a state parameter list.
Figure 5:
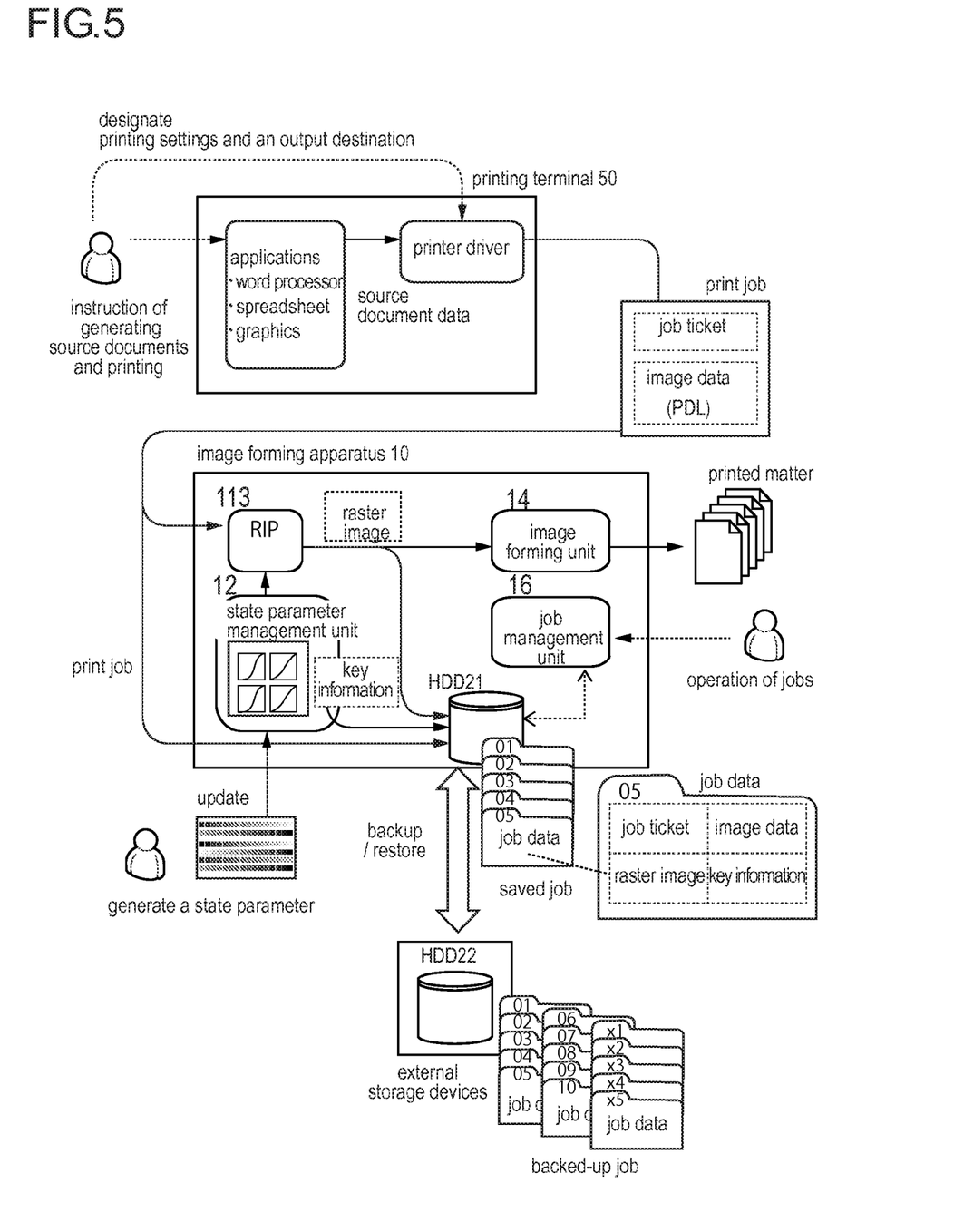
FIG. 5 is a schematic diagram illustrating a flow of each data.

FIG. 1 is a schematic diagram depicting a structure of an image forming apparatus according to a first embodiment of the present invention, and FIG. 2 is a block diagram of control of the image forming apparatus. FIGS. 3A and 3B and FIG. 4 are diagrams illustrating state parameters. FIG. 5 is a schematic diagram illustrating a flow of job data and the like.

As depicted in FIG. 1, image forming apparatuses 10 (10a, 10b) are connected to a printing terminal 50 and external storage devices 22 via a network N. The image forming apparatuses 10 are electrophotographic printers and form full-color images formed with four color toners of C, M, Y, and K on paper. The printing terminal 50 is, for example, a personal computer (PC), and transmits a print job by operation of a user and a request or the like concerning job management or update of a state parameter. A plurality of sets of job data are saved in an internal storage device 21 as a first storage unit provided in a main body of each of the image forming apparatuses 10. At least one set of job data saved in the internal storage unit 21 is backed up by an operation instruction of a user into the external storage device 22 as a second storage unit provided outside each of the image forming apparatuses 10, and the at least one set of job data saved by the backup is restored by an operation instruction. The internal storage devices 21 and the external storage devices 22 are large capacity storage devices such as, for example, a hard disk drive (HDD) or a solid state drive (SSD). In the example depicted in FIG. 1, an external storage device 22a is locally connected to the image forming apparatus 10a via a universal serial bus (USB) standard or the like. On the other hand, external storage devices 22b and 22c are storage devices provided in a file server located on a local or foreign network and transmits/receives data to/from the image forming device 10a and an image forming device 10b via the network N. The external storage devices 22a, 22b, and 22c can be accessed from both the image forming apparatuses 10a and 10b. In addition, in the present embodiment, the respective image forming apparatuses 10a and 10b have authorities for new addition, reading, writing, and deletion in a file storage area (folder) that handles job data of the external storage devices 22a, 22b, and 22c.

As depicted in a block diagram of control of the image forming apparatus 10 of FIG. 2, the image forming apparatus 10 includes a printer controller 11, a state parameter management unit 12, an engine control unit 13, an image forming unit 14, an operation and display unit 15, a job management unit 16, and the internal storage device 21. A print job sent from the printing terminal 50 is received by a reception unit 111 of the printer controller 11. The printing terminal 50 transmits a printing job (also referred to as print job) including a job ticket and image data.

In the job ticket, there are described processing contents regarding various printing settings such as a paper size, an order of printing of each image data, information on placement on a paper surface, and a post-processing content. The image data is described in a printer language such as PS or PCL, which is generated by a printer driver of the printing terminal 50. The printer language is analyzed by a PDL analysis unit 112 and then converted into intermediate data. The intermediate data is data that can be processed by a RIP (raster image processing unit) 113. The intermediate data is subjected to rasterization processing by the RIP 113 to be converted into raster image data in a bit map form (hereinafter referred to simply as "raster image"). The rasterization processing uses a "state parameter" maintained in the state parameter management unit 12. The state parameter will be described later. The raster image generated by the RIP 113 is sent to the engine control unit 13. The engine control unit 13 controls the image forming unit 14 to allow the image forming unit 14 to form an image on paper on the basis of the job ticket and the raster image. The operation and display unit 15 is composed of a touch panel or the like formed by superimposing a touch sensor on a liquid crystal display panel and receives an operation instruction from a user. The job management unit 16 performs file management into the internal storage devices 21 and the external storage devices 22 on the basis of the operation instruction by a user from the operation and display unit 15 or the printing terminal 50.

<State Parameter>

Next, a description will be given of a state parameter with reference to FIGS. 3A and 3B and FIG. 4. FIG. 3A is a diagram illustrating a state parameter, and FIG. 3B is another exemplary state parameter. As depicted in FIG. 3A, color information of each pixel of image data described in the PDL are, for example, device-independent RGB signals with 8 bits per color, such as sRGB. In rasterization processing, the input color signals are converted into device-dependent CMYK color signals with an output of 8 bits per color (hereinafter referred to also as "printer device value") using a state parameter.

Output characteristics of an image of the image forming apparatus 10 change depending on (1) unique values to a main body, such as a machine size of the main body of the image forming apparatus 10 and variation in a physical property value of a two-component developer or the like including toner therein, (2) uses of a photosensitive drum and a two-component developer and deterioration over time due to abrasion of a machine component, and (3) environments such as temperature and humidity to be used. When the output characteristics change, colors of an image formed on paper vary even in the same printer device value. It is thus necessary to correct the change in order to perform high quality output with high color reproducibility. The state parameter is adjustment data for correcting changes in the output characteristics. As a method for calculating a state parameter, for example, a large amount of patch images ranging from about several hundreds to several thousands output at different printer device values by instructions of a user are formed on paper. Then, colorimetric measurements of the patch images are performed by an external colorimeter or a colorimeter provided in the image forming device, whereby a state parameter in accordance with output characteristics can be calculated. Calculation of a state parameter may be performed by an external device such as the printing terminal 50 or the like, or color measurement data may be input to the image forming apparatus 10 to calculate a state parameter by the state parameter management unit 12. A standard frequency for calculating and updating a state parameter is about once every few months, but the calculation and update of a state parameter may be performed at a shorter interval than that.

A modified example of FIG. 3B is a simple state parameter. The state parameter depicted in the drawing is used for converting RGB signals into intermediate color signals of C', M', Y' and K' by an upper-stage first parameter and converting them into printer device values of CMYK by a lower-stage second parameter (a state parameter). The first parameter is basically a fixed value and is not changed even when output characteristics of the image forming apparatus main body change. On the other hand, the second parameter is a parameter whose value is changed in accordance with changes in the output characteristics. The second parameter may be, for example, a one-dimensional conversion table for converting an 8-bit signal value of each color to an 8-bit signal value of each corresponding color, like C'→C, M'→M, Y'→Y, and K'→K. In such a case, setting (calculation) of a parameter can be easily performed, and an amount of data can be made very small.

FIG. 4 is a diagram depicting a list of state parameters maintained in the image forming apparatus 10. As described above, state parameter is updated as appropriate by an instruction of a user depending on changes in the output characteristics of the image forming apparatus main body. In the example depicted in a Table 1 of the drawing, the current state parameter is a parameter updated on Nov. 10, 201x and provided with key information: "ID 102". The "current state parameter" is used for rasterization processing by the RIP 113. On the other hand, the state parameter provided with key information: "ID 101" is an old state parameter immediately before the current one, and is currently not used for rasterization processing by the RIP 113. Key information is set by the state parameter management unit 12. The example depicted in FIG. 4 uses, as the key information, a serial number provided by the image forming apparatus each time the state parameter is updated. However, the key information is not limited thereto, and in a case of "a state parameter" that is a small amount of data, like (1) a time stamp at a time of update of a state parameter, (2) a hash value calculated from a state parameter, or (3) the state parameter in FIG. 3B, the state parameter itself may be used as key information.

FIG. 5 is a schematic diagram illustrating a flow of job data. In the drawing, the same reference numerals are given to the same functional constituent units as those in FIGS. 1 and 2 and a description thereof will be omitted. A user causes the printing terminal 50 to generate source document data by various applications operating on an OS. The user sets the source document data, printing settings, and an output destination (a main body ID of the image forming apparatus) on a printer driver, and based on the settings, the printer driver generates a job ticket, generates image data described in the PDL on the basis of the source document data, and transmits them as a print job. The RIP 113 generates a raster image from the received image data by cooperating with the PDL analysis unit 112, as described above. The generated raster image is sent to the image forming unit 14, and based on the raster image, image formation is performed on paper to obtain a printed matter.

A "job ticket" and "image data" that are included in the print job, a "raster image" generated by the RIP 113 on the basis of the image data, and "key information" of a state parameter used for generating the raster image will be saved as a set of job data in the internal storage device 21. The set of job data is backed up or restored into the external storage device 22 on the basis of a processing request for backup or restoration from a user via the operation and display unit 15. Hereinafter, the set of job data saved in the internal storage device 21 will be referred to also as "saved job", and the set of job data backed up into the external storage device 22 will be referred to also as "backed-up job".

<Control Flow Regarding Backup Processing>

Figure 6:
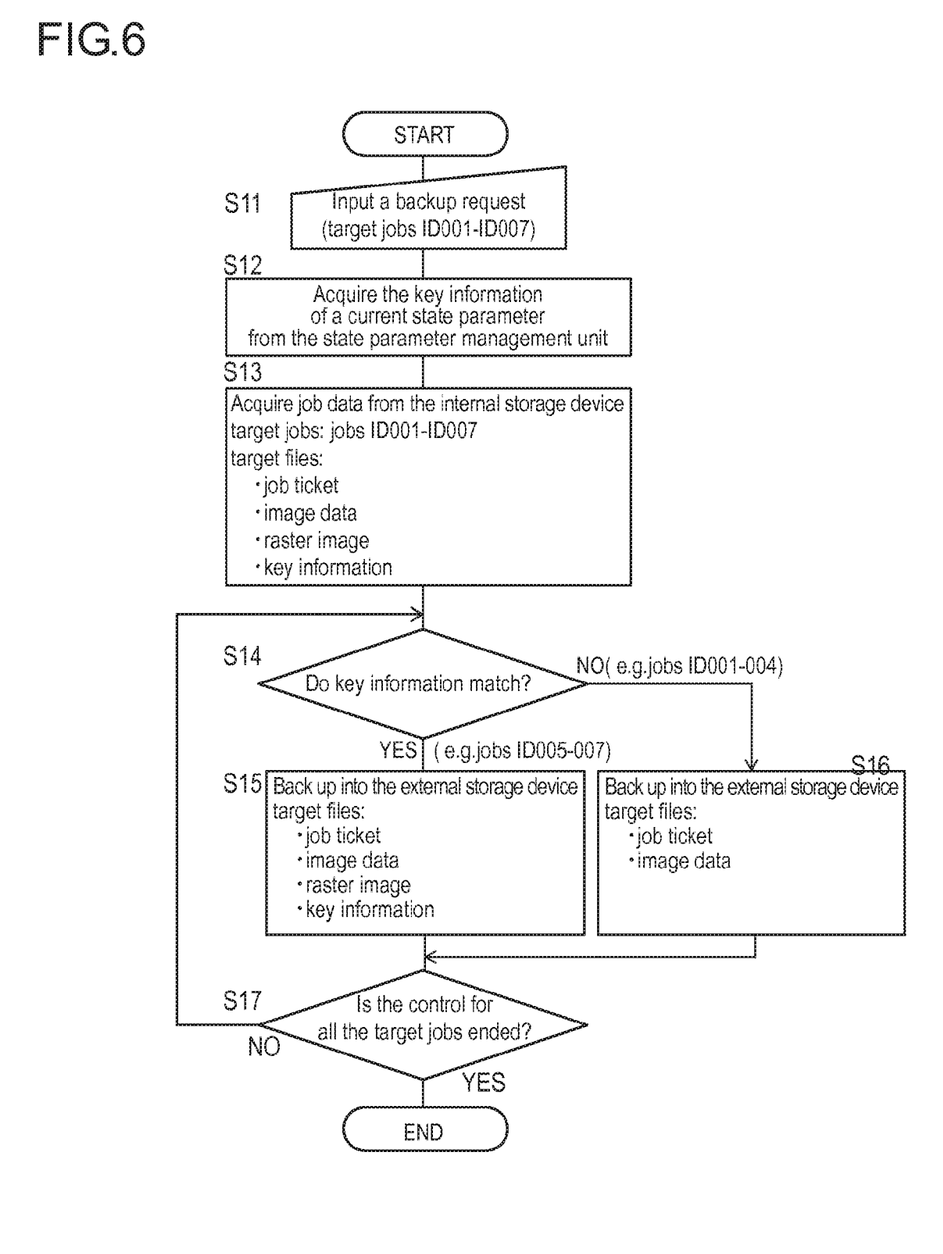
FIG. 6 is a control flow diagram of backup processing.
Figure 7:
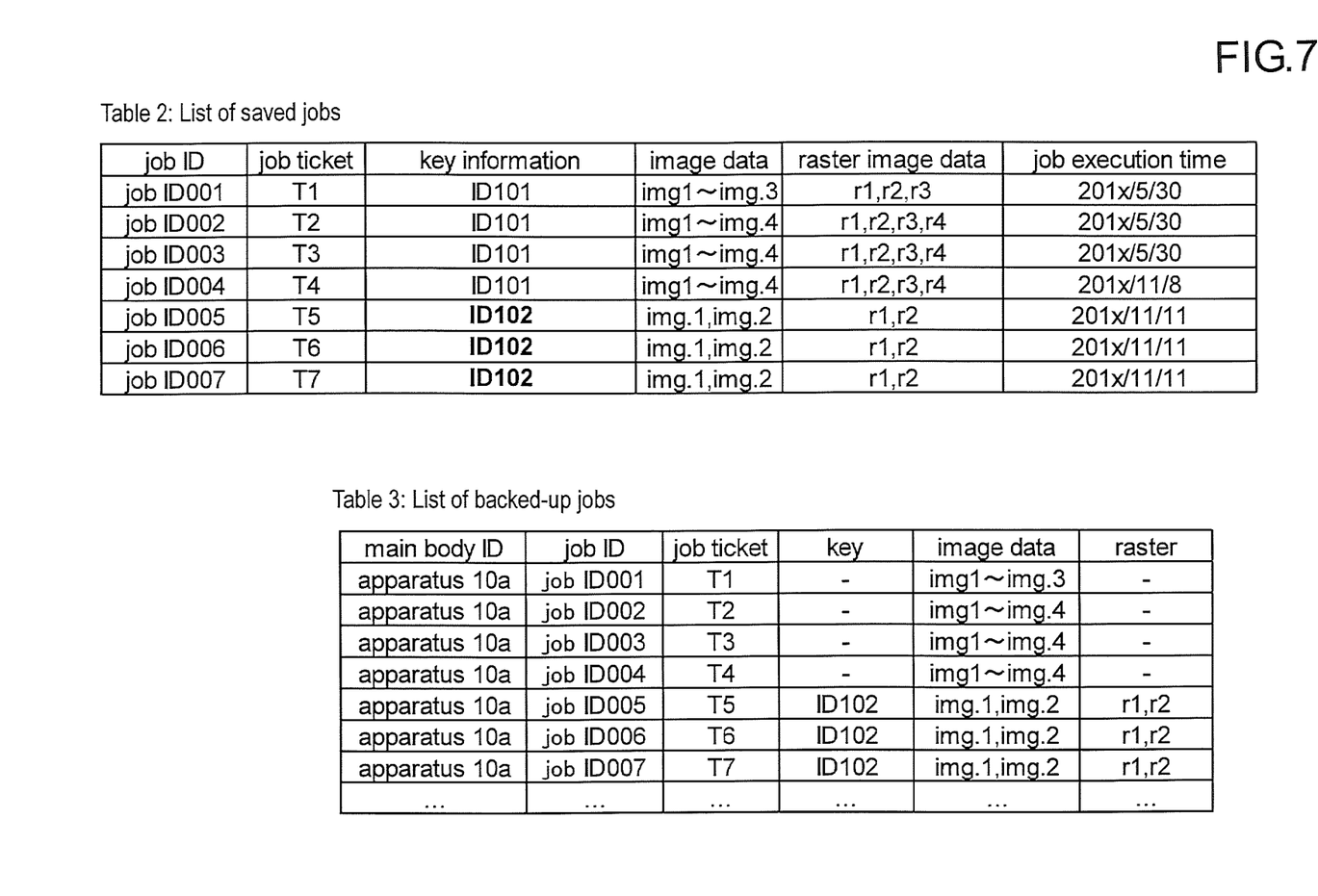
FIG. 7 is an example of a saved job list and a backed-up job list.

Next, a description will be given of backup processing executed mainly by the job management unit 16 with reference to FIG. 6 and FIG. 7. FIG. 6 is a diagram of a control flow regarding the backup processing, and FIG. 7 is an example of job lists. In a step S11 of FIG. 6, a backup request from a user is input via an operation panel of the operation and display unit 15. The backup request includes information for specifying at least one set of job data that is a target for backup. As a method for specifying the at least one set of job data, a single job or a plurality of jobs may be designated from among saved jobs saved in the internal storage device 21, or all of the saved jobs may be designated. In the example depicted in a Table 2 of FIG. 7A, jobs ID 001 to ID 007 are saved as saved jobs in the internal storage device 21. Then, in a step S11, all of the saved jobs are designated as target jobs for backup.

In a step S12, the key information of a current state parameter used in the RIP 113 is acquired from the state parameter management unit 12. In the example of FIG. 4, the key information is "ID 102". In a step S13, job data of each of the target jobs is acquired from the internal storage device 21. Pieces of data belonging to the job data are a job ticket, image data, a raster image, and key information. In a step S14, regarding each of the target jobs, the key information acquired in the step S12 is compared with the key information in the job data acquired in the step S13. As depicted in the Table 2 of FIG. 7, the jobs ID 005 to ID 007 have been subjected to rasterization processing using the current state parameter, so that the key information is "ID 102", which matches the key information acquired in the step S13 (step S14: YES). As a result, in a step S15, regarding the jobs ID 005 to ID 007, the job data including the raster image and the key information is backed up into the external storage device 22.

On the other hand, the jobs ID 001 to ID 004 of the target jobs for backup have been subjected to rasterization processing using not the current state parameter but a state parameter immediately before the current one, and the key information is ID 101. Accordingly, it does not match the key information "ID 102" acquired in the step S13 (step S14: NO). Thus, in a step S16, except for the raster image and the key information, the job data is backed up into the external storage device 22.

The control from the step S13 to the step S16 is repeatedly performed for the target jobs for backup until the control for all the target jobs is ended (step S17).

A Table 3 of FIG. 7 is a list of sets of job data that have been backed up by the above backup processing. From the drawing, regarding the jobs ID 001 to ID 004, it can be seen that the raster image and the key information have not been backed up. A backup destination in the external storage device 22 may be designated by the user, or the job management unit 16 may set a predetermined folder.

<Control Flow Regarding Restoration Processing>

Next, a description will be given of restoration processing executed by the job management unit 16 with reference to FIG. 8. In a step S21 of FIG. 8, a restoration request from a user is input via the operation panel of the operation and display unit 15. The restoration request includes information for setting at least one set of job data as a target for restoration. However, the user may refer to a storage folder of the external storage device 22 to designate one or a plurality of sets of job data from among backed-up jobs. Alternatively, the user may designate the entire folder or a main body ID (see the Table 3 of FIG. 7) of the apparatus itself to specify at least one set of job data to be targeted.

In a step S22, the key information of a current state parameter used in the RIP 113 is acquired from the state parameter management unit 12. In a step S23, key information of a target job is acquired from among the backed-up jobs in the external storage device 22. At this time, as depicted in the Table 3 of FIG. 7, there may be a case in which job data of the target job does not include key information. In this case, obviously, key information acquired is NULL data.

In a step S24, regarding the target job for restoration, the key information acquired in the step S22 is compared with the key information acquired in the step S23. When these pieces of key information match each other (step S24:YES), in a step S25, job data of the target job including the raster image and the key information is restored in a storage area of the internal storage device 21 or the like of the image forming apparatus 10.

On the other hand, regarding a target job whose key information does not match the key information of the current state parameter (step S24: NO), in a step S26, job data excluding the raster image and the key information is restored in the storage area of the image forming apparatus 10.

The control of from the step S23 to the step S26 is repeatedly performed for the target jobs for restoration until the control for all the target jobs is ended (step S27).

<Advantageous Effects>

As obvious from the above description, in the present embodiment, in the case of the sets of job data subjected to rasterization processing using the current state parameter, the sets of job data including the raster image are backed up or restored when executing the processing of backup or restoration. In other words, a raster image generated by rasterization processing using not the current state parameter but a state parameter before the current one is not used as a target for backup or restoration processing. This is because even if image formation is performed by reusing such a raster image, color reproducibility becomes inappropriate, so that high quality images cannot be obtained.

Accordingly, the present embodiment does not use a nonreusable raster image as a target for the processing of backup into the external storage device 22 or restoration from the external storage device 22. Because backup of such an unnecessary raster image is not performed, wasteful consumption of the storage area of the external storage device 22 can be avoided. In addition, even in a case of a raster image that has become unnecessary after backup, restoration of the raster image is not performed, which thus can avoid occurrence of wasteful processing concerning restoration processing and can avoid wasteful consumption of the storage area of the image forming apparatus 10 due to restoration processing. On the other hand, a raster image subjected to rasterization processing using the current state parameter can be reused, so that appropriately backing up and restoring the raster image makes it unnecessary to perform raster image processing again (re-RIP), thereby allowing efficient processing.

Regarding job data whose raster image cannot be reused, image data is subjected to rasterization processing again (re-RIP) using the current state parameter to generate a new raster image. Additionally, as depicted in FIG. 7 and the like, the pieces of key information corresponding to nonreusable raster images have not been targets for backup and restoration. However, but this is merely an example, and such pieces of key information may also be targets for backup and restoration. The reason for that is as follows. When a raster image has an A4 paper size, it has a very large file size ranging from 100 to 200 MB per page. On the other hand, key information has a very small file size of several Kbs or less. Accordingly, even if unnecessary key information is used as a target for backup or restoration, influence thereof is small.

<Control Flow Regarding Deletion Processing of Raster Image in Backed-Up Job>

Next, a description will be given of deletion processing of a raster image in a backed-up job and a modified example of the deletion processing with reference to each of FIGS. 9 and 10. The deletion processing of the raster image is performed, for example, as a target, on a raster image that was subjected to rasterization processing using a latest (current) state parameter at the time of backup and then has become nonreusable ex post facto due to update of the state parameter executed in the image forming apparatus 10 after that or any other reason. The deletion processing will be described below.

Figure 8:
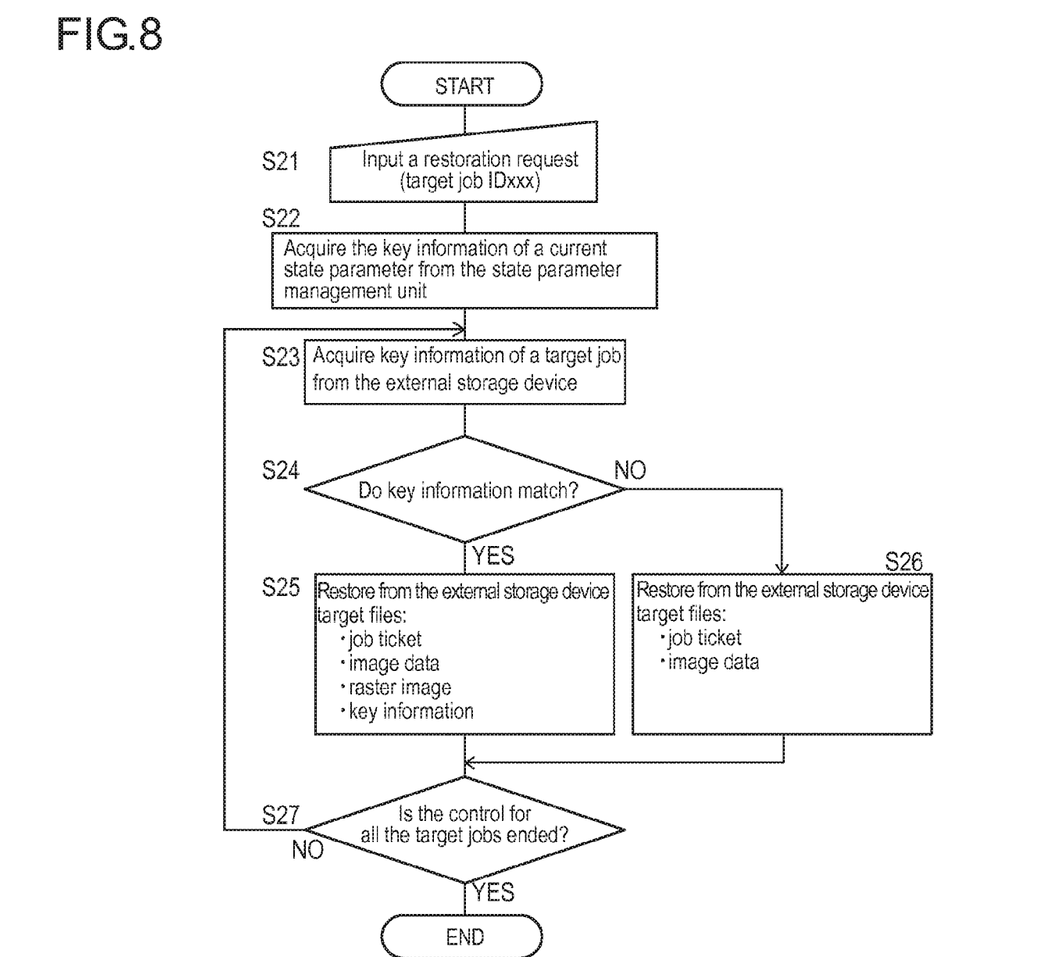
FIG. 8 is a control flow diagram of restoration processing.
Figure 9:
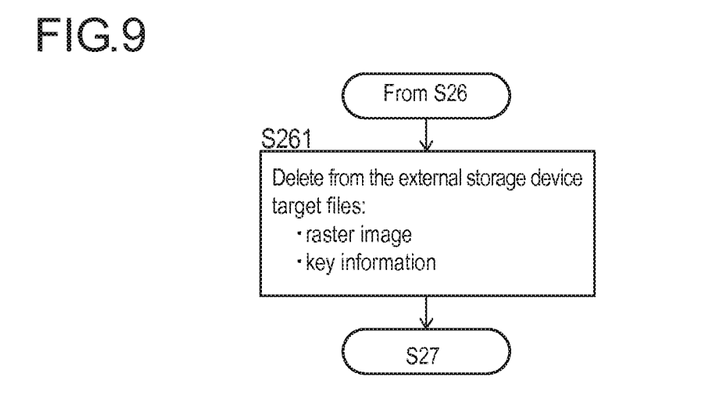
FIG. 9 is a control flow diagram of processing for deleting a raster image.

FIG. 9 is a control flow diagram regarding a first deletion processing executed by the job management unit 16. The drawing illustrates processing executed following the step S26 of FIG. 8. When the key information of the state parameter does not match that of the target job, in the step S261, key information and a raster image included in the backed-up job as the target for restoration are deleted from the external storage device 22. After the deletion, processing of a step S27 of FIG. 8 will be executed.

In this way, the unnecessary raster image that has become nonreusable ex post facto can be deleted at the time of restoration, which thus allows avoidance of wasteful consumption of the storage area of the external storage device 2.

Next, a modified example of the deletion processing will be described with reference to FIG. 10. The deletion processing in the modified example is processing executed by the job management unit 16, the state parameter unit 12, or the like, where the deletion processing is collectively performed on targets that are a plurality of raster images that have become nonreusable due to update of a state parameter.

Figure 10:
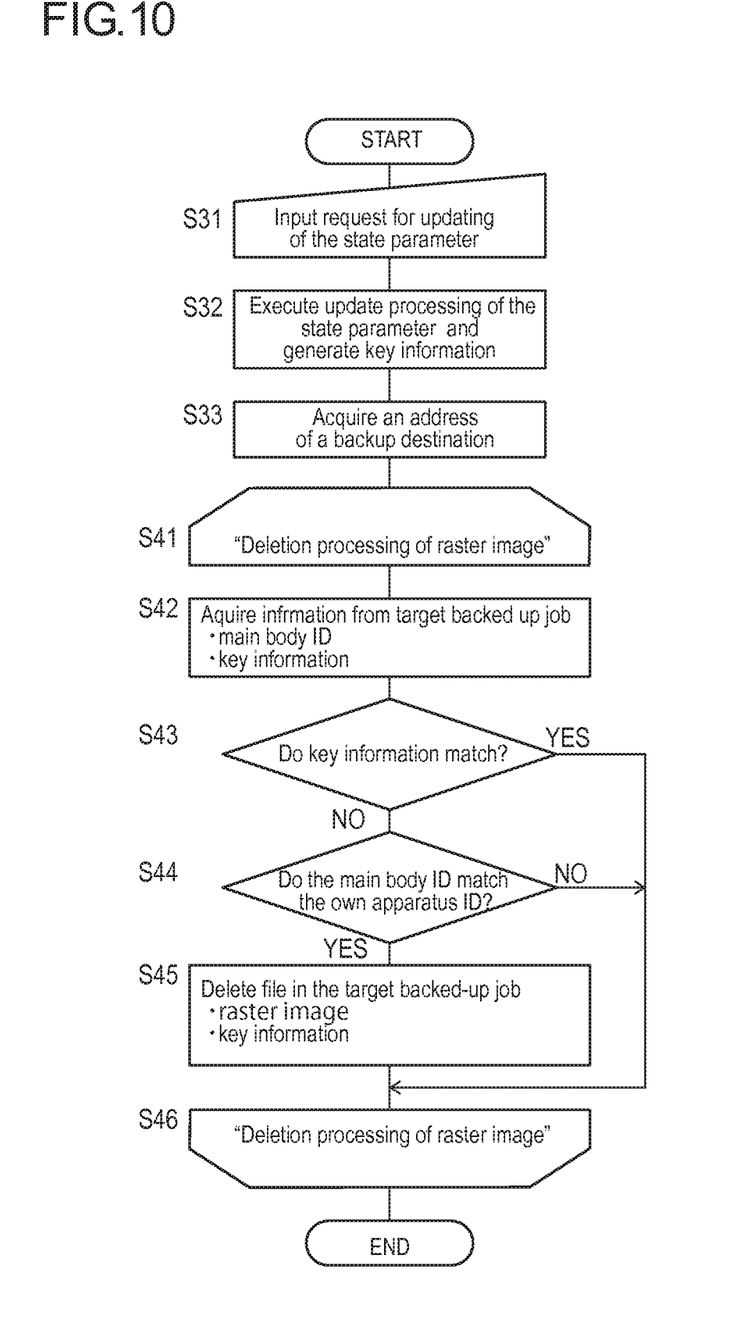
FIG. 10 is a control flow diagram of processing for collectively deleting a plurality of raster images.

In a step S31 of FIG. 10, a request for updating the state parameter is input. The request may be input via the operation panel of the operation and display unit 15 or may be input via the printing terminal 50. In a step S32, update processing of the state parameter is executed. The update processing of the state parameter is executed mainly by the state parameter management unit 12. The image forming unit 14 is caused to form a large amount of patch images having different printer device values of CMYK, and colorimetric measurements of the images are performed by a colorimeter. Based on printer device values corresponding to colorimetric measurement data obtained from the patch images, a state parameter is generated to update the current state parameter. Since then, the RIP 113 executes rasterization processing using the updated state parameter. In addition, when updating the state parameter, the state parameter management unit 12 generates key information of the updated state parameter.

In a step S33, an address of a backup destination is acquired. When the backup destination is a single external storage device 22 and a folder for backup destination is fixed, the address of the backup destination is an address of the folder. In addition, when the external storage device 22 is located on a foreign network, the backup destination address is an IP address on the foreign network. In that case, the network address of the backup destination may be maintained as a history at the time of backup to obtain information of the backup destination address from the history.

In steps S41 to S46, for all backed-up jobs included in the backup destination address, deletion of a raster image is performed depending on determination results. Specifically, in a step S42, a main body ID (apparatus identification information) and key information included in a target backed-up job present in the backup destination address are acquired. The main body ID information may be included in the job ticket or the key information. Alternatively, as depicted in the Table 3 of FIG. 7, the main body ID information may be information separated from them. In a step S43, it is determined whether or not the key information acquired in the step S42 matches the key information of the current state parameter generated in the step S32. In a step S44, it is determined whether or not the main body ID acquired in the step S42 matches the main body ID of an own apparatus (hereinafter referred to as "own apparatus ID").

When the key information does not match that of the current state parameter (step S43: NO) and the main body ID matches the own apparatus ID (step S44: YES), the raster image and the key information included in the target backed-up job are deleted in a next step S45. On the other hand, when the key information matches that of the current state parameter (step S43: YES) or the main body ID does not match the own apparatus ID (step S44: NO), the raster image and the key information are not deleted from the backed-up job.

Since then, for backed-up jobs in the backup destination address, the pieces of processing ranging from the steps S42 to S46 are repeated in order until the series of processing are done for all the backed-up jobs (END).

Herein, as depicted in the step S44 of FIG. 10, when the main body ID included in the backed-up job does not match the own apparatus ID, the raster image is not the target for deletion. This is because that the raster image may be one generated by another image forming apparatus and may be reusable by the other image forming apparatus. On the other hand, since the state parameter is adapted to characteristics unique to each image forming apparatus, there is almost no possibility of matching of state parameters between different apparatuses, such as the image forming apparatus 10a and the image forming apparatus 10b. In other words, there is almost no possibility that a raster image generated using a state parameter of the own apparatus is reused in another apparatus. Accordingly, as depicted in a control flow of FIG. 10, even when a raster image generated using a past state parameter of the own apparatus is deleted, there is no problem.

Thus, the second deletion processing depicted in FIG. 10 allows collective deletion of raster images that have become unlikely to be reused, thereby more effectively preventing wasteful consumption of the storage area of the external storage device 22.

The second deletion processing depicted in FIG. 10 uses the main body ID for determination of deletion. However, as long as it is managed such that the backup destination address is separated for each image forming apparatus into which backed-up jobs of other image forming apparatuses are not saved, the deletion may be determined, without using the main body ID, only depending on whether the pieces of key information match each other in the step S43.

In addition, in the present embodiment, the key information of the state parameter is used to determine whether to perform backup or restoration of a raster image. Instead of this, without using key information, a time stamp (time point of generation) of a raster image may be compared with a time stamp (time point of update) of a state parameter to determine whether or not the raster image has been generated using the current state parameter. For example, when the time stamp of the raster image is later than that of the state parameter, it can be determined that the raster image has been generated using the current state parameter.

<Modified Example using Key Classification Information>

A modified example using key classification information will be described with reference to FIGS. 11 to 13. Herein, the "key classification information" is information indicating the kind of a state parameter. There are two kinds of state parameters: "common" and "unique". The term "common" means a case of using a common state parameter without depending on characteristic changes of the image forming apparatus main body or the image forming apparatus. The term "unique" means a case of using a unique state parameter in which the state parameter as described in FIG. 4 or the like is changed as appropriate in response to characteristic changes of the image forming apparatus main body or the image forming apparatus. Whether the state parameter is common or unique is determined by the kinds of software and hardware of the image forming apparatus main body. In addition, even in the case of "common", different state parameters may be used depending on a version of software, particularly, versions of software of the printer controller 11 and the state parameter management unit 12. For example, there are cases in which update of software version improves color conversion-related processing. Update of software version may be performed manually due to intention of a user, a service man, or the like, or may be automatically performed under management of a management server in an environment where the apparatus is connected to the management server on a network. Then, regardless of manual or automatic operation, in most cases, software version is updated depending on the preference of a user, so that there may be co-existence of different versions in the market. Below will be a description of a modified example.

Figure 11:
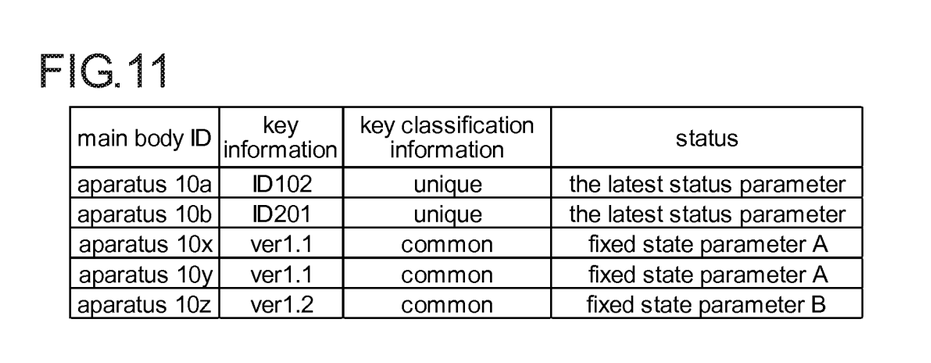
FIG. 11 is an example of a state parameter list in a modified example.

As depicted in a state parameter list of FIG. 11, key classification information of image forming apparatuses 10 whose main body IDs are apparatus 10a and apparatus 10b is "unique", whereas key classification information of image forming apparatuses 10 whose main body IDs are apparatus 10x, apparatus 10y, and apparatus 10z is "common". The image forming apparatuses 10 with the key classification information of "common" use rasterization processing software different in kind from that used in the image forming apparatuses 10 with the key classification information of "unique". In the software applied to the image forming apparatuses with the key classification information of "common", the state parameter is fixed, and the same state parameter is used among the different image forming apparatuses. Accordingly, the same rasterization processing is executed among the image forming apparatuses 10 with the key classification information of "common". In other words, in a case of the same image data (PDL form), basically the same raster image is obtained, regardless of the image forming apparatus main body used. However, there is an exceptional case where a version update influential on rasterization processing is performed on the kind of software, as will be described below.

In FIG. 11, it is indicated that, of the image forming apparatuses 10 with the key classification information of "common", to which a common type of software has been applied, key information of the apparatuses 10x and 10y is "ver. 1.1" and a state parameter A corresponding to the version 1.1 is used. On the other hand, it is similarly indicated that key information of the apparatus 10z is "ver. 1.2" and a state parameter B corresponding to the version 1.2 is used. In this case, the same rasterization processing is executed between the image forming apparatuses as the apparatus 10x and the apparatus 10y. Thus, raster images generated by these image forming apparatuses 10 can be used for each other. On the other hand, the image forming apparatus 10 as the apparatus 10z executes rasterization processing using the different state parameter. Thus, a generated raster image cannot be mutually used between the image forming apparatus 10 as the apparatus 10z and the other image forming apparatuses 10 with the different key information.

Figure 12:
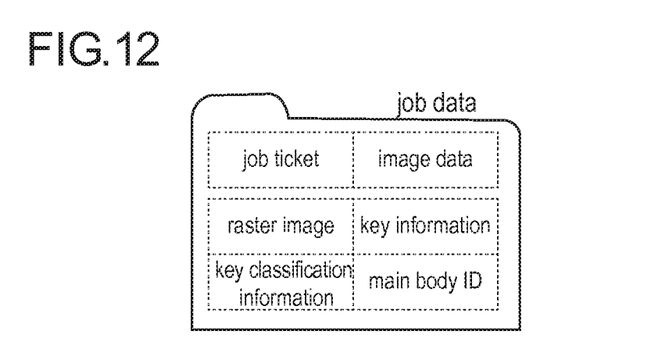
FIG. 12 is an example of job data in the modified example.

FIG. 12 is a diagram depicting a set of files saved in a backed-up job that has been backed up in the external storage device 22. As depicted in the drawing, the job data includes files of a job ticket, image data, a raster image, key information, key classification information, and a main body ID.

Next, raster image deletion processing will be described with reference to FIG. 13. The processing of the drawing is processing executed by the job management unit 16 following the step S26 of FIG. 8.

In a step S265, key classification information and a main body ID of the target job designated in the step S21 (FIG. 8) are acquired from among the backed-up jobs in the external storage device 22.

In steps S266 and S267, when the main body ID acquired in the step S265 matches the own apparatus ID and the key classification information is "unique", in a next step S268, the files of raster image, key information, key classification information, and main body ID are deleted from among the files (see FIG. 12) included in a backed-up job as a target for restoration. After the deletion, the processing of the step S27 of FIG. 8 is executed.

On the other hand, when the main body ID does not match the own apparatus ID or the key classification information is not "unique" but "common", the deletion processing of the step S268 is not performed, and then the processing of the step S27 of FIG. 8 is executed.

As described above, when the key classification information is not "unique" but "common", even a raster image generated by the own apparatus (for example, the apparatus 10x) can be used by another image forming apparatus 10 (for example, the apparatus 10y), so that the deletion processing of the step S268 is not executed. In this way, a raster image that may be reusable can be prevented from being deleted.

Figure 13:
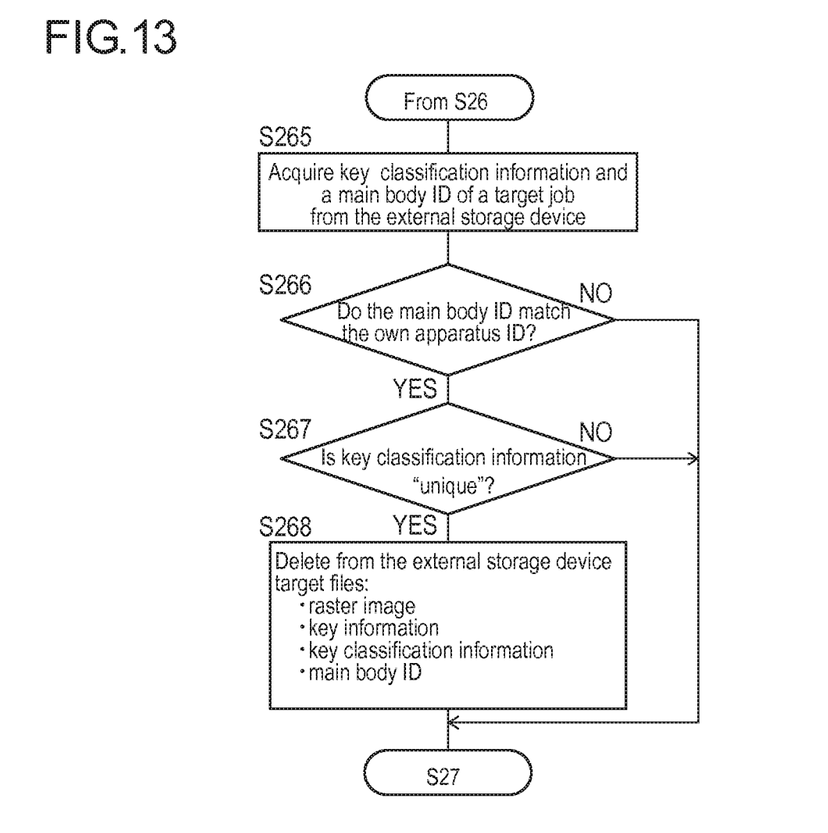
FIG. 13 is a control flow diagram of processing for deleting a raster image in the modified example.

FIG. 13 is the control flow in which key classification information has been applied to the control flow of FIG. 9. Similarly, determination of the step S267 of FIG. 13 may be performed between the step S44 and the step S45 of FIG. 10 so that key classification information is applied to the control flow of FIG. 10.

What is claimed is:

1. An image forming apparatus comprising:
a rasterization processing unit that performs rasterization processing on image data using a state parameter to generate raster image data;
an image forming unit that forms an image on a recording medium on the basis of the generated raster image data;
a first storage unit that saves, as a set of job data, the image data and the raster image data generated from the image data;
an update unit that updates the state parameter; and
a job management unit that, in response to a received processing request targeting at least one set of job data, executes processing of backup from the first storage unit into a second storage unit or restoration from the second storage unit,
wherein (1) when determining that the raster image data included in the at least one set of job data as a target of the processing has been generated using any state parameter other than a current state parameter, the job management unit executes the processing for the at least one set of job data except for the raster image data, whereas (2) when determining that the raster image data included in the at least one set of job data as the target of the processing has been generated using the current state parameter, the job management unit executes the processing for the at least one set of job data including the raster image data.

2. The image forming apparatus according to claim 1, wherein the second storage unit is an external storage device included in the image forming apparatus or connected to the image forming apparatus via a network.

3. The image forming apparatus according to claim 1, wherein the state parameter is a factor influencing the generation of the raster image data, and is adjustment data for correcting changes in output characteristics of the image forming unit with respect to an amount of signals of the image data.

4. An image forming apparatus comprising:
a rasterization processing unit that performs rasterization processing on image data using a state parameter to generate raster image data;
an image forming unit that forms an image on a recording medium on the basis of the generated raster image data;
a first storage unit that saves, as a set of job data, the image data, the raster image data generated from the image data, and key information of the state parameter used for the generation of the raster image data;
an update unit that updates the state parameter; and
a job management unit that, in response to a received backup processing request targeting at least one set of job data, executes processing of backup from the first storage unit into a second storage unit,
wherein when the key information in the at least one set of job data as a target of the processing does not match key information of a current state parameter, the job management unit executes backup processing for the at least one set of job data except for the raster image data, whereas when the key information in the at least one set of job data as the target of the processing matches the key information of the current state parameter, the job management unit executes backup processing for the at least one set of job data including the raster image data.

5. The image forming apparatus according to claim 4, wherein at a time of backup of the at least one set of job data including the raster image data into the second storage unit, the job management unit backs up together the key information of the state parameter used for the generation of the raster image data.

6. The image forming apparatus according to claim 5, wherein the job management unit is capable of executing processing of restoration from the second storage unit in response to a received restoration processing request targeting at least one set of job data; and
wherein when the key information included in the at least one set of job data as a target of the processing matches key information of a current state parameter, the job management unit executes restoration processing for the at least one set of job data including the raster image data, whereas when the key information included in the at least one set of job data as the target of the processing does not match the key information of the current state parameter, the job management unit executes restoration processing for the at least one set of job data except for the raster image data.

7. The image forming apparatus according to claim 5, wherein the job management unit is capable of executing processing of restoration from the second storage unit in response to a received restoration processing request targeting at least one set of job data; and wherein when, at a time of execution of the processing of the restoration, the key information included in the at least one set of job data as a target of the processing does not match key information of a current state parameter, the job management unit deletes the raster image data of the at least one set of job data backed up in the second storage unit.

8. The image forming apparatus according to claim 4, wherein, in response to update of the state parameter by the update unit, the job management unit deletes, from among sets of job data backed up in the second storage unit, the raster image data of at least one set of job data including the key information of a pre-update state parameter.

9. The image forming apparatus according to claim 4,
wherein the second storage unit is an external storage device included in the image forming apparatus or connected to the image forming apparatus via a network, and allows backup of at least one set of job data also from any image forming apparatus other than the image forming apparatus;
wherein the backed-up at least one set of job data further includes main body identification information of the image forming apparatus; and
wherein, in response to update of the state parameter by the update unit, the job management unit deletes, from among sets of job data backed up in the second storage, the raster image data of all sets of job data that include key information of any state parameter other than the current state parameter and the main body identification information of an apparatus itself.

10. The image forming apparatus according to claim 4, wherein the second storage unit is an external storage device included in the image forming apparatus or connected to the image forming apparatus via a network.

11. The image forming apparatus according to claim 4, wherein the state parameter is a factor influencing generation of the raster image data, and is adjustment data for correcting changes in output characteristics of the image forming unit with respect to an amount of signals of the image data.

12. A job data management method executed in an image forming apparatus including a rasterization processing unit that performs rasterization processing on image data using an updatable state parameter to generate raster image data; an image forming unit that forms an image on a recording medium on the basis of the generated raster image; and a first storage unit that saves, as a set of job data, the image data and the raster image data generated from the image data, the method comprising:
a step of receiving a processing request targeting at least one set of job data, for processing of backup from the first storage unit into a second storage unit or restoration from the second storage unit into the first storage unit;
a step of determining whether or not the raster image data included in the at least one set of job data as a target of the processing has been generated using a current state parameter; and
a step of, when a result of the determining step determines that the raster image data has been generated using any state parameter other than the current state parameter, executing processing corresponding to the processing request targeting the at least one set of job data except for the raster image data, whereas when the result of the determining step determines that the raster image data has been generated using the current state parameter, executing the processing for the at least one set of job data including the raster image data.

13. A job data management method executed in an image forming apparatus including a rasterization processing unit that performs rasterization processing on image data using an updatable state parameter to generate raster image data; an image forming unit that forms an image on a recording medium on the basis of the generated raster image data; and a first storage unit that saves, as a set of job data, the image data, the raster image data generated from the image data, and key information of the state parameter used for the generation of the raster image data, the method comprising:
a step of receiving a processing request for backup into a second storage unit other than the first storage unit;
a step of determining whether or not key information of at least one set of job data as a target for backup matches key information of a current state parameter; and
a step of, when a result of the determination step determines that the key information does not match the key information of the current state parameter, backing up the at least one set of job data except for the raster image data into the second storage unit, whereas when the key information matches the key information of the current state parameter, backing up the at least one set of job data including the raster image data.

* * * * *